(12) United States Patent
Pohl et al.

(10) Patent No.: US 8,763,487 B1
(45) Date of Patent: Jul. 1, 2014

(54) ENGAGEMENT MECHANISM (76) Inventors: Stephen L. Pohl, Prescott, WI (US); Jerry D. Lund, Ham Lake, MN (US)

( * ) Notice: Subject to any disclaimer, the term of this patent is extended or adjusted under 35 U.S.C. 154(b) by 161 days.

(21) Appl. No.: 13/475,296

(22) Filed: May 18, 2012

Related U.S. Application Data (60) Provisional application No. 61/487,793, filed on May 19, 2011.

(51) Int. Cl.
  *G05G 11/00* (2006.01)
  *G05G 13/00* (2006.01)
  *B62K 21/12* (2006.01)

(52) U.S. Cl.
  USPC ............................................ 74/488; 74/551.8

(58) Field of Classification Search
  USPC ......... 74/99 R, 469, 488, 491, 543, 544, 546, 74/551.8, 512
  See application file for complete search history.

(56) References Cited

U.S. PATENT DOCUMENTS

| | | | | |
|---|---|---|---|---|
| 1,846,081 A | * | 2/1932 | Berry | 188/357 |
| 1,912,261 A | * | 5/1933 | Defives | 91/434 |
| 3,088,328 A | * | 5/1963 | Peterson | 74/471 R |
| 4,232,565 A | * | 11/1980 | Leonheart | 74/489 |
| 4,560,049 A | * | 12/1985 | Uchibaba et al. | 192/85.01 |
| 4,771,649 A | * | 9/1988 | Modolo | 74/489 |
| 2010/0313696 A1 | * | 12/2010 | Vellutini | 74/491 |

* cited by examiner

*Primary Examiner* — Justin Krause
(74) *Attorney, Agent, or Firm* — Joan I. Norek; The Law Office of Joan I. Norek (57) ABSTRACT

An engagement mechanism amplifies an applied force to a lever by torque conversion about a rotation point to a higher reaction force that is applied to a master cylinder assembly for operation of a hydraulic clutch or brake system.

4 Claims, 6 Drawing Sheets

ENGAGEMENT MECHANISM

This application claims the domestic priority benefit of application No. 61/487,793 filed on May 19, 2011, inventors Stephen L. Pohl et al., for Engagement Mechanism.

BACKGROUND OF THE INVENTION

The present invention is in the technical field of power transmission. More specifically, the present invention is in the technical field of lever actuated hydraulic clutch and brake engagement and disengagement.

Conventional clutch and brake lever devices on typical saddle vehicles such as dirt bikes, street bikes and scooters all behave in a similar way. The clutch lever is designed such that the operator uses the pinky and ring fingers to grip the handlebar while reaching for the lever with the middle and index fingers. When the lever is squeezed to disengage the clutch, the lever would pinch the pinky and ring fingers unless the clutch or brake is fully disengaged prior to reaching this point. Holding the clutch or brake in this position places great strain on the grip of the pinky and ring fingers. In order to regain a strong grip on the handlebar, the operator must first release the grip on the handle bar entirely to re-grip and squeeze the lever with all four fingers past the fully disengaged position to the end stroke of the lever. This can result in a compromise of control while steering the vehicle.

SUMMARY OF THE INVENTION

The present invention is an engagement mechanism for a hydraulic master cylinder that engages and disengages the clutch or brake of a saddle type vehicle or similar. It is comprised of a lever with a plurality of adjustable features, an adjustment block, and a linkage with a plurality of adjustable features, and in at least some embodiments with a combination of a short-lever-arm lever and L-shaped piston rod. Compared to a conventional clutch and brake lever systems that have none of the following features, the present invention has the ability to improve the mechanical forces required to operate the clutch or brake system. The applied force required to actuate the clutch or brake is controlled through an adjustable ratio lever. The reach required to grip the lever is adjusted by a stroke limiting screw. The position of initial clutch engagement or brake disengagement while releasing the lever is controlled by an adjustment screw. The force that the operator applies is distributed over a larger surface area by virtue of a wider lever. The grip on the lever can be changed from one to two or three fingers while squeezing the lever without releasing the handlebar.

DETAILED DESCRIPTION OF THE INVENTION

Figure 1:
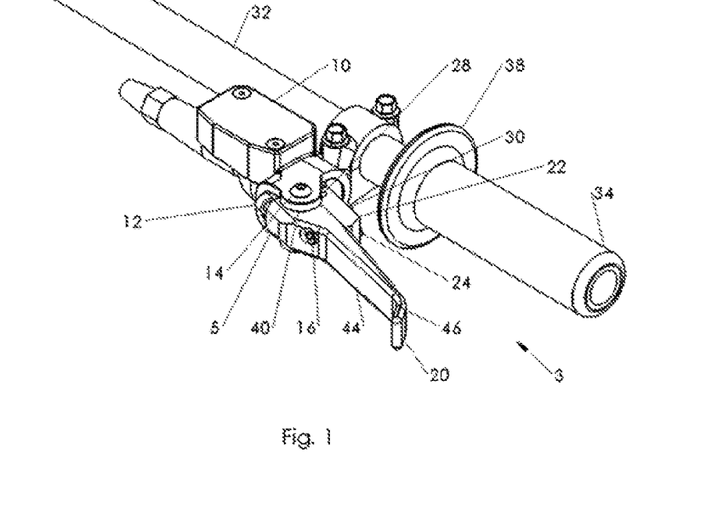
FIG. 1 is a perspective view of a handle-bar assembly including a clutch engagement mechanism of the present invention.
Figure 2:
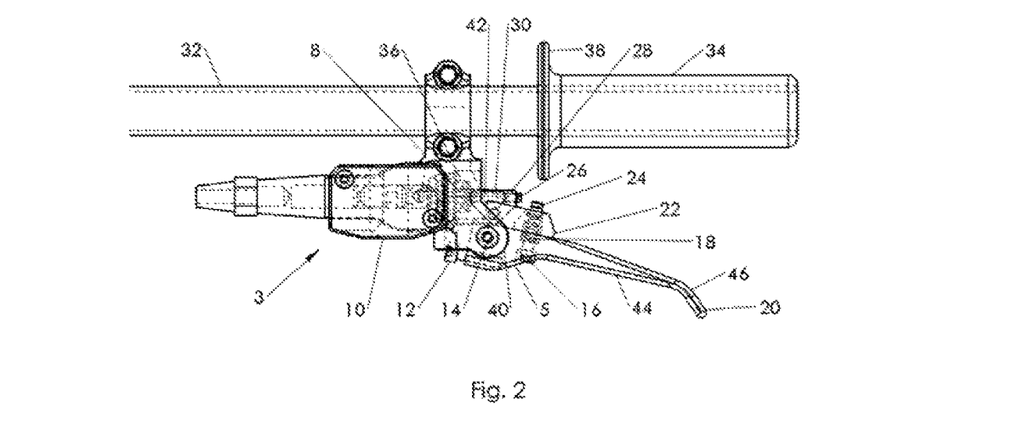
FIG. 2 is a top view of a handle-bar assembly including a clutch engagement mechanism of FIG. 1.

Referring now to the invention in more detail, in FIG. 1 and FIG. 2 there is shown a handle-bar assembly 3 including an engagement mechanism 5 mounted to a master cylinder assembly 10 which is mounted on a handle bar 32. The handle-bar assembly 3 includes the engagement mechanism 5 having a pivot bolt 14 holding a lever 20 in a pivoting configuration through the clevis 40 on the master cylinder assembly 10. The lever 20 features a finger grip surface 44 and a hooked end 46. The engagement mechanism 5 includes a secondary adjustment screw 12 threaded into the lever 20. An adjustment block 22 is attached to the lever 20 by means of a tertiary adjustment screw 16 and a secondary dowel pin 24 in a slip fit configuration. A spring 18 is located axially concentric to the secondary dowel pin 24. The spring 18 is compressed between the lever 20 and the adjustment block 22. A linkage 30 is connected to the adjustment block 22 in a pivoting configuration with a primary dowel pin 28. The master cylinder assembly 10 has a piston rod 8 which is oriented axially concentric to, and seats into a hole feature 42 in the linkage 30. A primary adjustment screw 26 is axially concentric with the piston rod 8. The piston rod 8 passes through a rubber boot 36. As noted above, the whole assembly of the engagement mechanism 5 and the master cylinder 10 is mounted on the handle bar 32 or other functionally similar device. As shown, a hand grip 34 with a flange 38 is mounted on the end of the handle bar 32.

For clarification, by the term "linkage", such as the linkage 30, is meant a part in the assembly that transmits the torsional force input into the system to a linear force that is output from the system.

In further detail, still referring to the invention of FIG. 1 and FIG. 2 the engagement mechanism 5 as shown provides the lever 20 that in its released position is pressed against the master cylinder assembly 10 through the secondary adjustment screw 12. This secondary adjustment screw 12 controls the distance the lever 20 can move away from the handgrip 34. The force applied by the operator to the lever 20 on the finger grip surface 44 results in a torque about the pivot bolt 14 and a reaction force which is applied to the piston rod 8 through the assembly configuration of the adjustment block 22 and the linkage 30. The adjustment block 22 allows the operator to change the distance of the primary dowel pin 28 from the pivot bolt 14 and thereby change the ratio of the torque conversion of the applied force on the lever 20 and the force applied on the piston rod 8. Tightening the tertiary adjustment screw 16 compresses the spring 18 bringing the adjustment block 22 and the primary dowel pin 28 closer to the pivot bolt 14. This decreases the magnitude of the force applied to the lever 20 needed to drive the piston rod 8 forward to disengage the clutch (not shown). The piston rod 8 moves in an arc that minimizes the angle of deflection of the piston rod 8 with respect to the master cylinder 10 centerline due to the separation distance of the primary dowel pin 28 and the hole feature 42 in the linkage 30 that holds the piston rod 8. This dynamic geometric relationship minimizes distortion of the rubber boot 36 and minimizes adverse side loading of the master cylinder piston 51. The primary adjustment screw 26 enables the operator to adjust the distance of the lever 20 away from the hand grip 34 at which the clutch (not shown) begins to engage while being released from the fully disengaged position.

In further detail, still referring to the invention of FIGS. 1 and 2, the lever 20 of the engagement mechanism 5 as shown is approximately 100 mm in length measured from the center line of the pivot bolt 14 to the opposite end of the lever 20. The adjustable distance of the primary dowel pin 28 from the pivot bolt 14 ranges from approximately 10 mm to 20 mm. The adjustable range of the primary adjustment screw 26 is approximately 6.35 mm. The width of the lever 20 is approximately 17.5 mm. The finger grip surface 44 that the operator applies force to while disengaging the clutch (not shown) is smoothly contoured from the top side to the bottom side of the lever 20 starting at approximately 6.35 mm radius and blending to approximately 1.5 mm radius. The hooked end 46 of the lever 20 is approximately 12.25 mm in length at a 30 degree angle. The hooked end 46 of the lever 20 is rounded across the width of the lever 20 with a radius approximately equal to half the width of the lever 20. The end of the lever 20 is also rounded across the thickness of the lever 20 with a radius approximately equal to half the thickness of the end of the lever 20.

The construction details of the invention as shown in FIG. 1 and FIG. 2 are that the engagement mechanism 5 may be made of a combination of metals such as aluminum, titanium, stainless steel or other corrosion resistant materials or corrodible metals in combination with anti-corrosion coatings. In addition, any other sufficiently rigid and strong material may be used such as high strength plastic, or composite materials, and the like. Further, the various components of the engagement mechanism 5 can be made of different materials. The lever 20 may be sufficiently short to allow the master cylinder assembly 10 to be mounted to the handle bar 32 within its normal mounting range away from the hand grip 34, and still be in a position such that the lever 20 can be pulled with one finger, predominantly the pointer finger until the lever 20 contacts the hand grip 34 without squeezing the remaining fingers or requiring a repositioning of the remaining fingers on the hand grip 34. Additionally the lever 20 may be sufficiently long such that three fingers of an average operator can in combination squeeze the lever 20 until it contacts the hand grip 34 without deforming the flange 38 on the handgrip 34. The adjustable distance of the primary dowel pin 28 from the pivot bolt 14 ranges from a maximum distance such that the engagement mechanism 5 will actuate the piston rod 8 with less than the full stroke of the lever 20 to a minimum distance where the lever 20 is no longer able to push the piston rod 8 far enough to disengage the clutch (not shown) with the full stroke of the lever 20. The width of the lever 20 is narrow enough at the mounting end to freely fit into the clevis 40 of the master cylinder assembly 10 where the pivot bolt 14 mounts the lever 20 to the master cylinder assembly 10. The finger grip surface 44 of the lever 20 where the operator applies force while disengaging the clutch (not shown) is minimally equal to the clevis 40 width but can be greater than the clevis 40 width up to approximately the width of the handle bar 32 approximately 24.5 mm. Additionally the finger grip surface 44 where the operator applies force while disengaging the clutch (not shown) is smoothly contoured from the top side to the bottom side of the lever 20. The finger grip surface 44 of the lever 20 transitions from a lower average rate of curvature in the direction the operator applies force to a greater rate of curvature on the upper and lower sides of the lever 20. Alternate configurations of the present invention include but are not limited to utilizing a single piece construction combining the function of the piston rod 8 and the primary dowel pin 28 location in the linkage 30. Another configuration of the present invention combines the function of the adjustment block 22 with the lever 20 by putting the primary dowel pin 28 location in the body of the lever 20 at a fixed distance from the pivot bolt 14. Another configuration of the present invention utilizes a hinge mechanism to replace the function of the secondary dowel pin 24 and spring 18 on the adjustment block 22.

Figure 3:
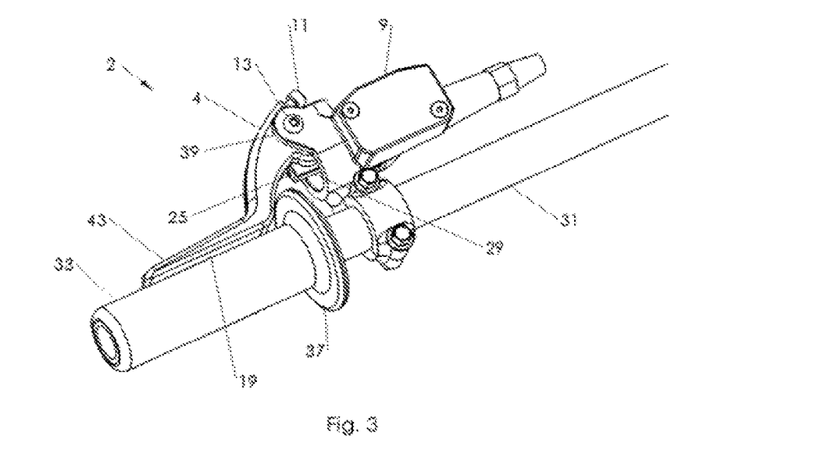
FIG. 3 is a perspective view of a handle-bar assembly including a clutch engagement mechanism of the present invention.
Figure 4:
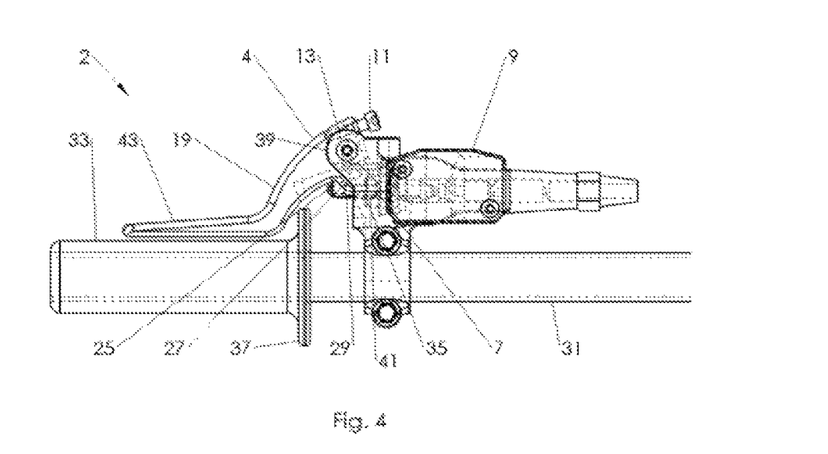
FIG. 4 is a top view of a handle-bar assembly including a clutch engagement mechanism of FIG. 3.

Referring now to the invention shown in FIG. 3 and FIG. 4 there is shown a handle-bar assembly 2 including an engagement mechanism 4 mounted to a master cylinder assembly 9 which is mounted on a handle bar 31. The handle-bar assembly 2 includes the engagement mechanism 4 having a pivot bolt 13 holding a lever 19 in a pivoting configuration through the clevis 39 on the master cylinder assembly 9 with a secondary adjustment screw 11 threaded into the lever 19. The lever 19 features a finger grip surface 43. A linkage 29 is connected to the lever 19 in a pivoting configuration with a primary dowel pin 27. The master cylinder assembly 9 includes a piston rod 7 which is oriented axially concentric to, and seats into a hole feature 41 in the linkage 29. A primary adjustment screw 25 is axially concentric with the piston rod 7. The piston rod 7 passes through a rubber boot 35. The whole assembly of the engagement mechanism 4 and the master cylinder 9 is mounted on a handle bar 31 or functionally-similar device. A hand grip 33 with a flange 37 is mounted on the end of the handle bar 31.

In further detail, still referring to the invention of FIG. 3 and FIG. 4, by virtue of the engagement mechanism 4, the lever 19 when in its released position is pressed against the master cylinder assembly 9 through the secondary adjustment screw 11. This secondary adjustment screw 11 controls the distance the lever 19 can move away from the handgrip 33. The force applied by the operator to the lever 19 on the finger grip surface 43 results in a torque about the pivot bolt 13 and a reaction force which is applied to the piston rod 7 through the linkage 29. The piston rod 7 moves in an arc that minimizes the angle of deflection of the piston rod 7 with respect to the master cylinder assembly 9 centerline due to the separation distance between the primary dowel pin 27 and the hole feature 41 that holds the piston rod 7. This dynamic geometric relationship minimizes distortion of the rubber boot 35 and minimizes adverse side loading of the master cylinder piston 52. The primary adjustment screw 25 enables the operator to adjust the distance of the lever 19 away from the hand grip 33 at which the clutch (not shown) begins to engage while being released from the fully disengaged position.

In further detail, still referring to the invention of FIG. 3 and FIG. 4, the lever 19 of the engagement mechanism 4 is approximately 100 mm in length as measured from the center line of the pivot bolt 13 to the opposite end of the lever 19. The width of the lever 19 is approximately 17.5 mm. The adjustable range of the primary adjustment screw 25 is approximately 6.35 mm. The finger grip surface 43 that the operator applies force to while disengaging the clutch (not shown) is smoothly contoured from the top side to the bottom side of the lever 19 starting at approximately 6.35 mm radius and blending to approximately 1.53 mm radius The end of the lever 19 is rounded across the width of the lever 19 with a radius approximately equal to half the width of the lever 19. The end of the lever 19 is also rounded across the thickness of the lever 19 with a radius approximately equal to half the thickness of the end of the lever 19.

The construction details of the invention as shown in FIG. 3 and FIG. 4 are that the engagement mechanism 4 may be made of a combination of metals such as aluminum, titanium, stainless steel or other corrosion resistant materials or corrodible metals in combination with anti-corrosion coatings. In addition, any other sufficiently rigid and strong material may be used such as high strength plastic, or composite materials, and the like. Further, the various components of the engagement mechanism 4 can be made of different materials. The lever 19 may be sufficiently short to allow the master cylinder assembly 9 to be mounted to the handle bar 31 within its normal mounting range away from the hand grip 33, and still be in a position such that the lever 19 can be pulled with one finger, predominantly the pointer finger until the lever 19 contacts the hand grip 33 without pinching the remaining fingers or requiring a repositioning of the remaining fingers on the hand grip 33. Additionally the lever 19 may be sufficiently long such that three fingers of an average operator can in combination squeeze the lever 19 until it contacts the hand grip 33 without deforming the flange 37 on the handgrip 33. The width of the lever 19 is narrow enough at the mounting end to freely fit into the clevis 39 of the master cylinder assembly 9 where the pivot bolt 13 mounts the lever 19 to the master cylinder assembly 9. The finger grip surface 43 of the lever 19 where the operator applies force while disengaging the clutch (not shown) is minimally equal to the clevis 39 width but can be greater than the clevis 39 width up to approximately the width of the handle bar 31, approximately 24.5 mm. Additionally, the finger grip surface 43 where the operator applies force while disengaging the clutch (not shown) is smoothly contoured from the top side to the bottom side of the lever 19. The lever 19 finger grip surface 43 transitions from a lower average rate of curvature in the direction the operator applies force to a greater average rate of curvature on the upper and lower sides of the lever 19. Alternate configurations of the present invention include but are not limited to utilizing a single piece construction combining the function of the piston rod 7 and the primary dowel pin 27 location in the linkage 29

The advantages of the present invention include, without limitation, reduced force required to pull the lever to disengage the clutch. It is easier to maintain a strong hold on the handle bar during aggressive maneuvering because the average diameter of the grip as an operators hand encircles the hand grip and lever is reduced when the clutch is fully disengaged. Typically a stock clutch lever is operated with the pointer and index fingers and the remaining fingers are used to maintain a tight hold on the hand grip. Because a typical lever extends to the end of the handle bar an operator can not pull the lever to the fully contracted position without pinching the gripping fingers. In the present invention, clearance from the end of the lever to the end of the hand grip prevent an operators fingers encircling the hand grip from being squeezed between the lever and the hand grip when the lever is fully contracted by either one, two or three fingers encircling both the lever and the hand grip during operation of the lever. Operator fatigue is reduced because the clearance from the end of the lever to the end of the hand grip and the short hook at the end of the lever enables the operator to increase or decrease the number of fingers employed to squeeze the lever without releasing and re-gripping the lever during aggressive maneuvering. There is a reduction of load concentrations on the operator's fingers as force is applied to the lever because of larger surface area distribution of the load due to the greater width and contoured profile of the lever. Operator fatigue is also reduced by limiting the maximum reach required for the operator's fingers to grip the lever through the primary adjustment screw.

Figure 5:
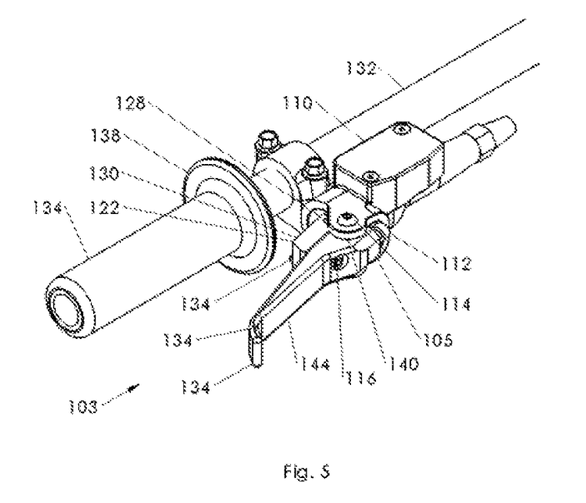
FIG. 5 is a perspective view of a handle-bar assembly including a brake engagement mechanism of the present invention.
Figure 6:
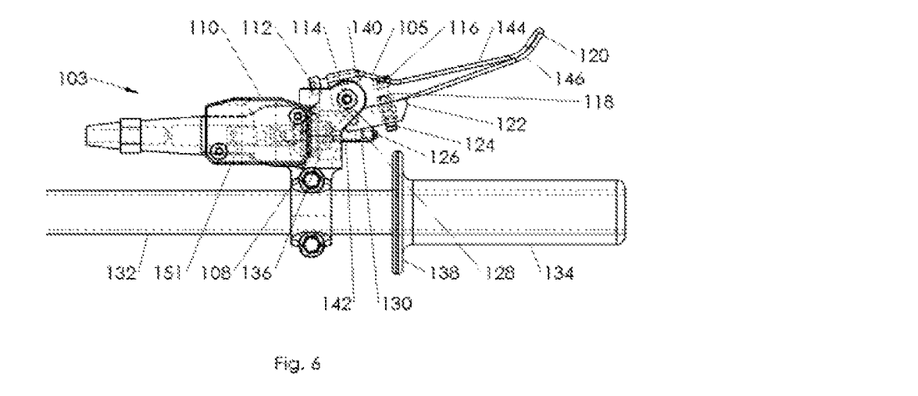
FIG. 6 is a top view of a handle-bar assembly including a brake engagement mechanism of FIG. 5.

Referring now to the invention in more detail, in FIG. 5 and FIG. 6 there is shown a handle-bar assembly 103 including an engagement mechanism 105 mounted to a master cylinder assembly 110 which is mounted on a handle bar 132. The handle-bar assembly 103 includes the engagement mechanism 105 having a pivot bolt 114 holding a lever 120 in a pivoting configuration through the clevis 140 on the master cylinder assembly 110. The lever 120 features a finger grip surface 144 and a hooked end 146. The engagement mechanism 105 includes a secondary adjustment screw 112 threaded into the lever 120. An adjustment block 122 is attached to the lever 120 by means of a tertiary adjustment screw 116 and a secondary dowel pin 124 in a slip fit configuration. A spring 118 is located axially concentric to the secondary dowel pin 124. The spring 118 is compressed between the lever 120 and the adjustment block 122. A linkage 130 is connected to the adjustment block 122 in a pivoting configuration with a primary dowel pin 128. The master cylinder assembly 110 has a piston rod 108 which is oriented axially concentric to, and seats into a hole feature 142 in the linkage 130. A primary adjustment screw 126 is axially concentric with the piston rod 108. The piston rod 108 passes through a rubber boot 136. As noted above, the whole assembly of the engagement mechanism 105 and the master cylinder 110 is mounted on the handle bar 132 or other functionally similar device. As shown, a hand grip 134 with a flange 138 is mounted on the end of the handle bar 132.

For clarification, by the term "linkage", such as the linkage 130, is meant a part in the assembly that transmits the torsional force input into the system to a linear force that is output from the system.

In further detail, still referring to the invention of FIG. 5 and FIG. 6 the engagement mechanism 105 as shown provides the lever 120 that in its released position is pressed against the master cylinder assembly 110 through the secondary adjustment screw 112. This secondary adjustment screw 112 controls the distance the lever 120 can move away from the handgrip 134. The force applied by the operator to the lever 120 on the finger grip surface 144 results in a torque about the pivot bolt 114 and a reaction force which is applied to the piston rod 108 through the assembly configuration of the adjustment block 122 and the linkage 130. The adjustment block 122 allows the operator to change the distance of the primary dowel pin 128 from the pivot bolt 114 and thereby change the ratio of the torque conversion of the applied force on the lever 120 and the force applied on the piston rod 108. Tightening the tertiary adjustment screw 116 compresses the spring 118 bringing the adjustment block 122 and the primary dowel pin 128 closer to the pivot bolt 114. This decreases the magnitude of the force applied to the lever 120 needed to drive the piston rod 108 forward to engage the brake (not shown). The piston rod 108 moves in an arc that minimizes the angle of deflection of the piston rod 108 with respect to the master cylinder 110 centerline due to the separation distance of the primary dowel pin 128 and the hole feature 142 in the linkage 130 that holds the piston rod 108. This dynamic geometric relationship minimizes distortion of the rubber boot 136 and minimizes adverse side loading of the master cylinder piston 151. The primary adjustment screw 126 enables the operator to adjust the distance of the lever 120 away from the hand grip 134 at which the brake (not shown) begins to disengage while being released from the fully engaged position.

In further detail, still referring to the invention of FIGS. 5 and 102, the lever 120 of the engagement mechanism 105 as shown is approximately 100 mm in length measured from the center line of the pivot bolt 114 to the opposite end of the lever 120. The adjustable distance of the primary dowel pin 128 from the pivot bolt 114 ranges from approximately 10 mm to 20 mm. The adjustable range of the primary adjustment screw 126 is approximately 6.35 mm. The width of the lever 120 is approximately 17.5 mm. The finger grip surface 144 that the operator applies force to while engaging the brake (not shown) is smoothly contoured from the top side to the bottom side of the lever 120 starting at approximately 6.35 mm radius and blending to approximately 1.5 mm radius. The hooked end 146 of the lever 120 is approximately 12.25 mm in length at a 130 degree angle. The hooked end 146 of the lever 120 is rounded across the width of the lever 120 with a radius approximately equal to half the width of the lever 120. The end of the lever 120 is also rounded across the thickness of the lever 120 with a radius approximately equal to half the thickness of the end of the lever 120.

The construction details of the invention as shown in FIG. 5 and FIG. 6 are that the engagement mechanism 105 may be made of a combination of metals such as aluminum, titanium, stainless steel or other corrosion resistant materials or corrodible metals in combination with anti-corrosion coatings. In addition, any other sufficiently rigid and strong material may be used such as high strength plastic, or composite materials, and the like. Further, the various components of the engagement mechanism 105 can be made of different materials. The lever 120 may be sufficiently short to allow the master cylinder assembly 110 to be mounted to the handle bar 132 within its normal mounting range away from the hand grip 134, and still be in a position such that the lever 120 can be pulled with one finger, predominantly the pointer finger until the lever 120 contacts the hand grip 134 without squeezing the remaining fingers or requiring a repositioning of the remaining fingers on the hand grip 134. Additionally the lever 120 may be sufficiently long such that three fingers of an average operator can in combination squeeze the lever 120 until it contacts the hand grip 134 without deforming the flange 138 on the handgrip 134. The adjustable distance of the primary dowel pin 128 from the pivot bolt 114 ranges from a maximum distance such that the engagement mechanism 105 will actuate the piston rod 108 with less than the full stroke of the lever 120 to a minimum distance where the lever 120 is no longer able to push the piston rod 108 far enough to fully engage the brake (not shown) with the full stroke of the lever 120. The width of the lever 120 is narrow enough at the mounting end to freely fit into the clevis 140 of the master cylinder assembly 10 where the pivot bolt 114 mounts the lever 120 to the master cylinder assembly 110. The finger grip surface 144 of the lever 120 where the operator applies force while engaging the brake (not shown) is minimally equal to the clevis 140 width but can be greater than the clevis 140 width up to approximately the width of the handle bar 132 approximately 24.5 mm. Additionally the finger grip surface 144 where the operator applies force while engaging the brake (not shown) is smoothly contoured from the top side to the bottom side of the lever 120. The finger grip surface 144 of the lever 120 transitions from a lower average rate of curvature in the direction the operator applies force to a greater rate of curvature on the upper and lower sides of the lever 120. Alternate configurations of the present invention include but are not limited to utilizing a single piece construction combining the function of the piston rod 108 and the primary dowel pin 128 location in the linkage 130. Another configuration of the present invention combines the function of the adjustment block 122 with the lever 120 by putting the primary dowel pin 128 location in the body of the lever 120 at a fixed distance from the pivot bolt 114. Another configuration of the present invention utilizes a hinge mechanism to replace the function of the secondary dowel pin 124 and spring 118 on the adjustment block 122.

Figure 7:
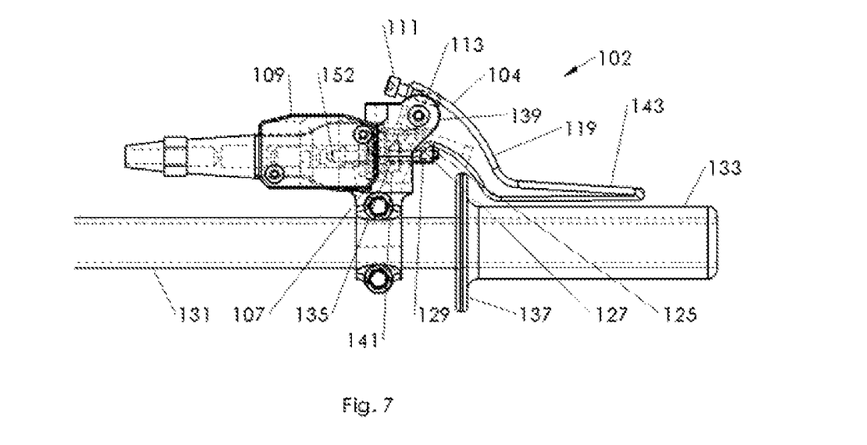
FIG. 7 is a perspective view of a handle-bar assembly including a brake engagement mechanism of the present invention.
Figure 8:
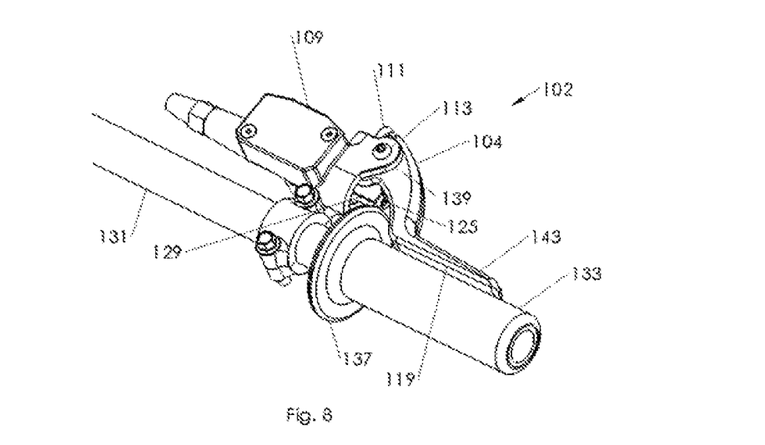
FIG. 8 is a top view of a handle-bar assembly including a brake engagement mechanism of FIG. 7.

Referring now to the invention shown in FIG. 7 and FIG. 8 there is shown a handle-bar assembly 102 including an engagement mechanism 104 mounted to a master cylinder assembly 109 which is mounted on a handle bar 131. The handle-bar assembly 102 includes the engagement mechanism 104 having a pivot bolt 113 holding a lever 119 in a pivoting configuration through the clevis 139 on the master cylinder assembly 109 with a secondary adjustment screw 111 threaded into the lever 119. The lever 119 features a finger grip surface 143. A linkage 129 is connected to the lever 119 in a pivoting configuration with a primary dowel pin 127. The master cylinder assembly 109 includes a piston rod 107 which is oriented axially concentric to, and seats into a hole feature 141 in the linkage 129. A primary adjustment screw 125 is axially concentric with the piston rod 107. The piston rod 107 passes through a rubber boot 135. The whole assembly of the engagement mechanism 104 and the master cylinder 109 is mounted on a handle bar 131 or functionally-similar device. A hand grip 133 with a flange 137 is mounted on the end of the handle bar 131.

In further detail, still referring to the invention of FIG. 7 and FIG. 8, by virtue of the engagement mechanism 104, the lever 119 when in its released position is pressed against the master cylinder assembly 109 through the secondary adjustment screw 111. This secondary adjustment screw 111 controls the distance the lever 119 can move away from the handgrip 133. The force applied by the operator to the lever 119 on the finger grip surface 143 results in a torque about the pivot bolt 113 and a reaction force which is applied to the piston rod 107 through the linkage 129. The piston rod 107 moves in an arc that minimizes the angle of deflection of the piston rod 107 with respect to the master cylinder assembly 109 centerline due to the separation distance between the primary dowel pin 127 and the hole feature 141 that holds the piston rod 107. This dynamic geometric relationship minimizes distortion of the rubber boot 135 and minimizes adverse side loading of the master cylinder piston 152. The primary adjustment screw 125 enables the operator to adjust the distance of the lever 119 away from the hand grip 133 at which the brake (not shown) begins to disengage while being released from the fully engaged position.

In further detail, still referring to the invention of FIG. 7 and FIG. 8, the lever 119 of the engagement mechanism 104 is approximately 100 mm in length as measured from the center line of the pivot bolt 113 to the opposite end of the lever 119. The width of the lever 119 is approximately 17.5 mm. The adjustable range of the primary adjustment screw 125 is approximately 6.35 mm. The finger grip surface 143 that the operator applies force to while engaging the brake (not shown) is smoothly contoured from the top side to the bottom side of the lever 119 starting at approximately 6.35 mm radius and blending to approximately 1.53 mm radius. The end of the lever 119 is rounded across the width of the lever 119 with a radius approximately equal to half the width of the lever 119. The end of the lever 119 is also rounded across the thickness of the lever 119 with a radius approximately equal to half the thickness of the end of the lever 119.

The construction details of the invention as shown in FIG. 7 and FIG. 8 are that the engagement mechanism 104 may be made of a combination of metals such as aluminum, titanium, stainless steel or other corrosion resistant materials or corrodible metals in combination with anti-corrosion coatings. In addition, any other sufficiently rigid and strong material may be used such as high strength plastic, or composite materials, and the like. Further, the various components of the engagement mechanism 104 can be made of different materials. The lever 119 may be sufficiently short to allow the master cylinder assembly 109 to be mounted to the handle bar 131 within its normal mounting range away from the hand grip 133, and still be in a position such that the lever 119 can be pulled with one finger, predominantly the pointer finger until the lever 119 contacts the hand grip 133 without pinching the remaining fingers or requiring a repositioning of the remaining fingers on the hand grip 133. Additionally the lever 119 may be sufficiently long such that three fingers of an average operator can in combination squeeze the lever 119 until it contacts the hand grip 133 without deforming the flange 137 on the handgrip 133. The width of the lever 119 is narrow enough at the mounting end to freely fit into the clevis 139 of the master cylinder assembly 109 where the pivot bolt 113 mounts the lever 119 to the master cylinder assembly 109. The finger grip surface 143 of the lever 119 where the operator applies force while engaging the brake (not shown) is minimally equal to the clevis 139 width but can be greater than the clevis 139 width up to approximately the width of the handle bar 131, approximately 24.5 mm. Additionally, the finger grip surface 143 where the operator applies force while engaging the brake (not shown) is smoothly contoured from the top side to the bottom side of the lever 119. The lever 119 finger grip surface 143 transitions from a lower average rate of curvature in the direction the operator applies force to a greater average rate of curvature on the upper and lower sides of the lever 119. Alternate configurations of the present invention include but are not limited to utilizing a single piece construction combining the function of the piston rod 107 and the primary dowel pin 127 location in the linkage 129

The advantages of the present invention include, without limitation, reduced force required to pull the lever to engage the brake. It is easier to maintain a strong hold on the handle bar during aggressive maneuvering because the average diameter of the grip as an operators hand encircles the hand grip and lever is reduced when the brake is fully engaged. Typically a stock brake lever is operated with the pointer and index fingers and the remaining fingers are used to maintain a tight hold on the hand grip. Because a typical lever extends to the end of the handle bar an operator can not pull the lever to the fully contracted position without pinching the gripping fingers. In the present invention, clearance from the end of the lever to the end of the hand grip prevent an operators fingers encircling the hand grip from being squeezed between the lever and the hand grip when the lever is fully contracted by either one, two or three fingers encircling both the lever and the hand grip during operation of the lever. Operator fatigue is reduced because the clearance from the end of the lever to the end of the hand grip and the short hook at the end of the lever enables the operator to increase or decrease the number of fingers employed to squeeze the lever without releasing and re-gripping the lever during aggressive maneuvering. There is a reduction of load concentrations on the operator's fingers as force is applied to the lever because of larger surface area distribution of the load due to the greater width and contoured profile of the lever. Operator fatigue is also reduced by limiting the maximum reach required for the operator's fingers to grip the lever through the primary adjustment screw.

In broad embodiment, the present invention is an engagement lever used to actuate a hydraulic system to controllably transmit power from a power source to a driven mechanism or to controllably dissipate energy from a power source to a fixed mechanism.

Short-Lever-Arm Lever and L-Shaped Piston Rod Combination

Figure 9A:
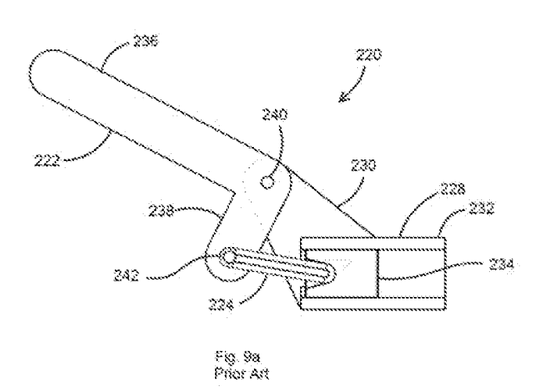
FIGS. 9a and 9b is a partially diagrammatic side view of a prior art long-lever-arm lever engagement mechanism in respectively a released and an actuated position.
Figure 9B:
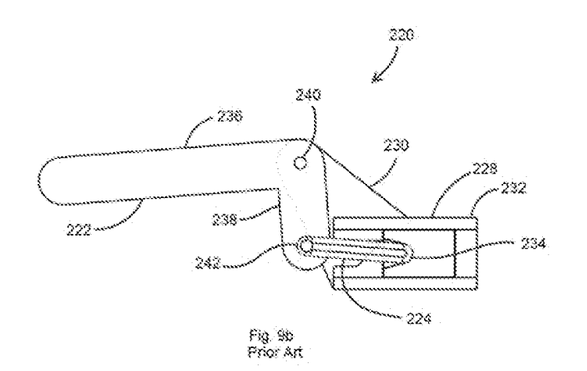

In at least some embodiments, the engagement mechanism of the present invention is and/or includes a combination of a short-lever-arm lever and L-shaped piston rod. A conventional engagement mechanism employs a standard (stock) long-armed lever and straight piston rod such as illustrated in FIG. 9a and FIG. 9b where there is shown a prior art engagement mechanism or core engagement mechanism 220 in respectively a released position (FIG. 9a) and an actuated position (FIG. 9b). The prior art core engagement mechanism 220 includes a conventional or stock long-armed lever 222 and a standard (stock) straight piston rod 224. As shown, the prior art core engagement mechanism 220 includes a housing 228 having a housing flange 230 and a housing track 232. Mounted in, and slidable along, the housing track 232 is a standard (stock) piston cup 234. The long-armed lever 222 has a long grip arm 236 and a standard (long) lever arm 238 extending at a right angle from the grip arm 236. The long-armed lever 222 is pivotally mounted at the juncture corner of the grip arm 236 and the lever arm 238 on the housing flange 230 and pivots thereat at a first pivot point 240. The straight piston rod 224 is pivotally mounted on the lever arm 238 and pivots thereat at second pivot point 242. The end of the straight piston rod 224 opposite second pivot point 242 is nestled within the piston cup 234. As seen in FIG. 9a and FIG. 9b, when the long-armed lever 222 is moved from the released to the actuated position, the straight piston rod 224 pushes the piston cup 234 along the housing track 232 without contacting any part of the housing 228.

Figure 10A:
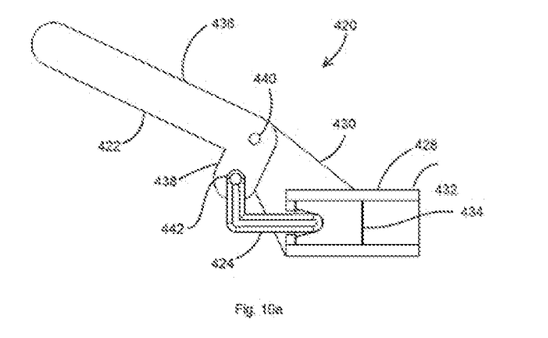
FIGS. 10a and 10b is a partially diagrammatic side view of a short-lever-arm lever and L-shaped piston rod engagement mechanism of the present invention in respectively a released and an actuated position.
Figure 10B:
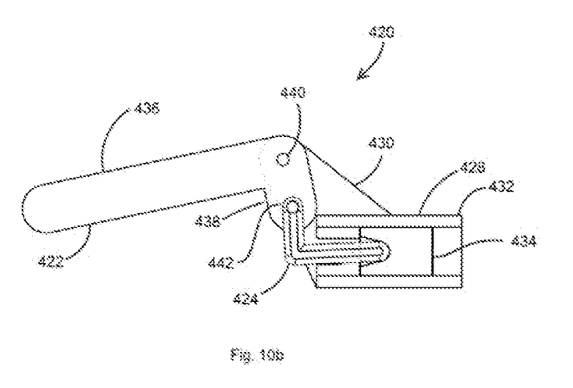

As illustrated in FIGS. 10a and 10b, the reduction of the mechanical actuation force required in this embodiment of the present invention is well achieved without any interference or binding with a conventional (stock) housing. In FIGS. 10a and 10b there is shown an engagement mechanism or core engagement mechanism 420 in respectively a released position (FIG. 10a) and in an actuated position (FIG. 10b). The core engagement mechanism 420 includes a short-armed lever 422 and an L-shaped piston rod 424. As shown, the core engagement mechanism 420 includes a housing 428 having a housing flange 430 and a housing track 432. Mounted in, and slidable along, the housing track 432 is a standard (stock) piston cup 434. The short-armed lever 422 has a long grip arm 436 and a short lever arm 438 extending at a right angle from the grip arm 436. The short-armed lever 422 is pivotally mounted at the juncture corner of the grip arm 436 and the lever arm 438 on the housing flange 430 and pivots thereat at a first pivot point 440. The L-shaped piston rod 424 is pivotally mounted on the lever arm 438 and pivots thereat at second pivot point 442. The end of the L-shaped piston rod 424 at the opposite end relative the second pivot point 442 is nestled within the piston cup 434. As seen in FIG. 10a and FIG. 10b, when the lever 422 moves from the released to the actuated position, the L-shaped piston rod 424 moves the piston cup 434 fully along the housing track 432 without interfering or binding with the housing 428.

As discussed above and illustrated in the drawings hereof, the present invention in some preferred embodiments is a core engagement mechanism of a saddle-vehicle hydraulic master cylinder engagement device. The engagement device has a housing (typically a conventional stock housing), a piston cup (typically a conventional piston cup) and a hydraulic cylinder (typically a conventional stock hydraulic cylinder). The housing has an upright flange and an elongate track. The piston cup is mounted on, and translatable along, the elongate track and has a depression. The core engagement mechanism is comprised of a short-armed lever and an L-shaped piston rod. The short-armed lever has an elongate gripping arm, a stub lever arm and a juncture corner section. The gripping arm and the stub lever arm are disposed extending at right angles from the juncture corner section. The short-armed lever is pivotally mounted at the juncture corner section on the upright flange. The L-shaped piston rod has a first and second leg and is pivotally mounted at the first leg on the stub lever arm. The distal end of the second leg disposed nesting in the depression of the piston cup. In further preferred embodiments, the length of the stub lever arm is from 10 to 20 percent of the length of the gripping arm and/or is less than the length of the first arm of the L-shaped piston rod. In further preferred embodiments, the L-shaped piston rod is in a position that is at or near co-axial alignment with the piston cup, for instance within 5 or 10 angular degrees of co-axial alignment.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

We claim:

1. A core engagement mechanism of a saddle-vehicle hydraulic master cylinder engagement device, said device having a housing, a piston cup and a hydraulic cylinder, said housing having an upright flange and an elongate track, said piston cup mounted on, and translatable along, said elongate track and having a depression, comprising:

a short-armed lever comprising an elongate gripping arm, a stub lever arm and a juncture corner section, said gripping arm and said stub lever arm disposed extending from said juncture corner section, said stub lever arm extending from said juncture corner section at a right angle from said gripping arm, wherein the length of said stub lever arm is from 10 to 20 percent of the length of said gripping arm, said short-armed lever pivotally mounted at said juncture corner section on said upright flange; and     an L-shaped piston rod having a first and second leg having a distal end, said L-shaped piston rod pivotally mounted at said first leg on said stub lever arm and said distal end of said second leg disposed nesting in said depression of said piston cup.

2. A core engagement mechanism of a saddle-vehicle hydraulic master cylinder engagement device according to claim 1 wherein the length of said stub lever arm is less than the length of said first arm of said L-shaped piston rod.

3. A core engagement mechanism of a saddle-vehicle hydraulic master cylinder engagement device according to claim 1 wherein said L-shaped piston rod is disposed within 10 angular degrees of a position in co-axial alignment with said piston cup.

4. A core engagement mechanism of a saddle-vehicle hydraulic master cylinder engagement device according to claim 1 wherein said L-shaped piston rod is disposed within 5 angular degrees of a position in co-axial alignment with said piston cup.

* * * * *